United States Patent [19]
Thöny

[11] Patent Number: 5,347,883
[45] Date of Patent: Sep. 20, 1994

[54] STEERING ROD CONNECTABLE TO THE STEERING COLUMN OF A VEHICLE

[76] Inventor: Franz Thöny, Prafatell 927, FL-9496 Balzers, Liechtenstein

[21] Appl. No.: 835,959
[22] PCT Filed: Jun. 15, 1991
[86] PCT No.: PCT/EP91/01115
  § 371 Date: Feb. 18, 1992
  § 102(e) Date: Feb. 18, 1992
[87] PCT Pub. No.: WO91/19636
  PCT Pub. Date: Dec. 26, 1991

[30] Foreign Application Priority Data
  Jun. 18, 1990 [CH] Switzerland .................. 2018/90

[51] Int. Cl.[5] .................. B62K 21/22; F16C 11/04
[52] U.S. Cl. .................. 74/551.3; 74/551.1; 403/84; 403/322
[58] Field of Search .......... 74/551.1, 551.3, 551.4, 74/551.5, 551.6, 551.7; 403/84, 322

[56] References Cited
U.S. PATENT DOCUMENTS

| | | | |
|---|---|---|---|
| 607,438 | 7/1898 | Hood | 74/551.1 X |
| 608,566 | 8/1898 | Anderson | 74/551.1 X |
| 689,217 | 12/1901 | Palmer | 74/551.3 |
| 2,594,451 | 4/1952 | Konsel | 74/551.3 |
| 4,939,950 | 7/1990 | Girvin | 74/551.1 |
| 5,018,405 | 5/1991 | Chiu | 74/551.3 X |
| 5,062,179 | 11/1991 | Huang | 74/551.3 X |

FOREIGN PATENT DOCUMENTS

| | | | |
|---|---|---|---|
| 361903 | 12/1906 | France . | |
| 12421 | 9/1910 | France . | |
| 1101558 | 6/1954 | France | 74/551.1 |
| 1502875 | 11/1967 | France . | |
| 2352705 | 1/1978 | France | 74/551.3 |
| 448852 | 5/1949 | Italy | 74/551.6 |
| 14132 | of 1896 | United Kingdom | 74/551.4 |
| 503237 | 8/1938 | United Kingdom | 74/551.4 |
| 841442 | 7/1960 | United Kingdom | 74/551.3 |
| 7761 | 3/1998 | United Kingdom | 74/551.4 |

Primary Examiner—Allan D. Hermann

[57] ABSTRACT

A steering rod, in particular for a wheeled vehicle is connected to a steering column by a centrally located connecting arrangement. The connecting arrangement has an articulated arm that can be bent about at least one hinge pin and fixed in various locking positions by a fixing means. The locking positions are defined on two opposing locking surfaces that are inelastically formed in the articulated arm parts, by pins engaged in depressions. The clamping distance of the fixing means is smaller than the length of the pins. Additional means completely release the pins from the depressions.

12 Claims, 3 Drawing Sheets

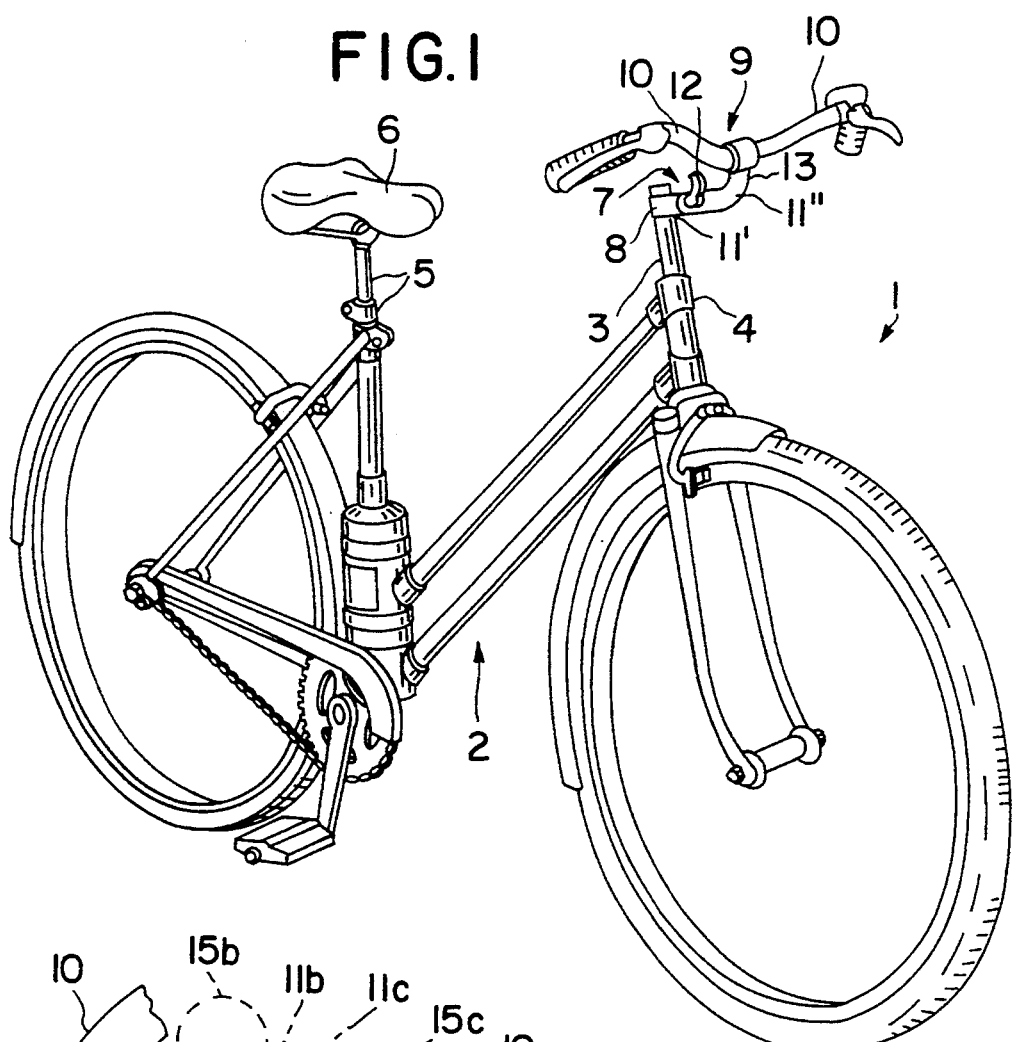
FIG.1
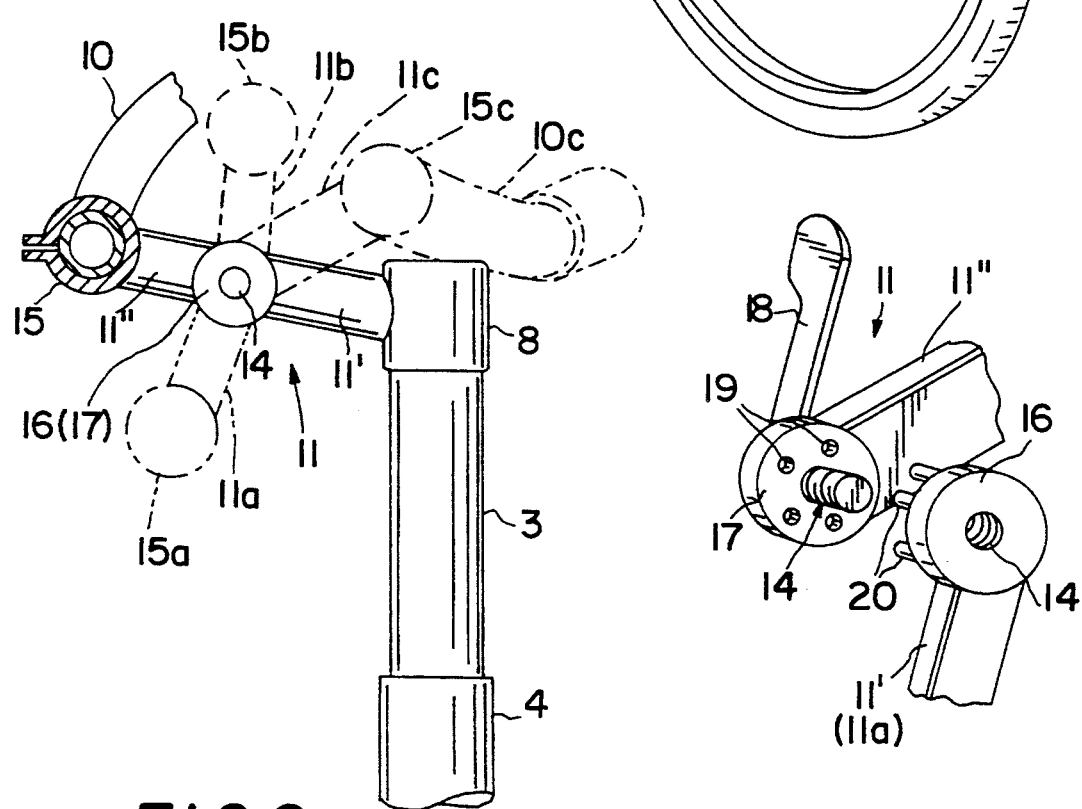
FIG.2
FIG.3

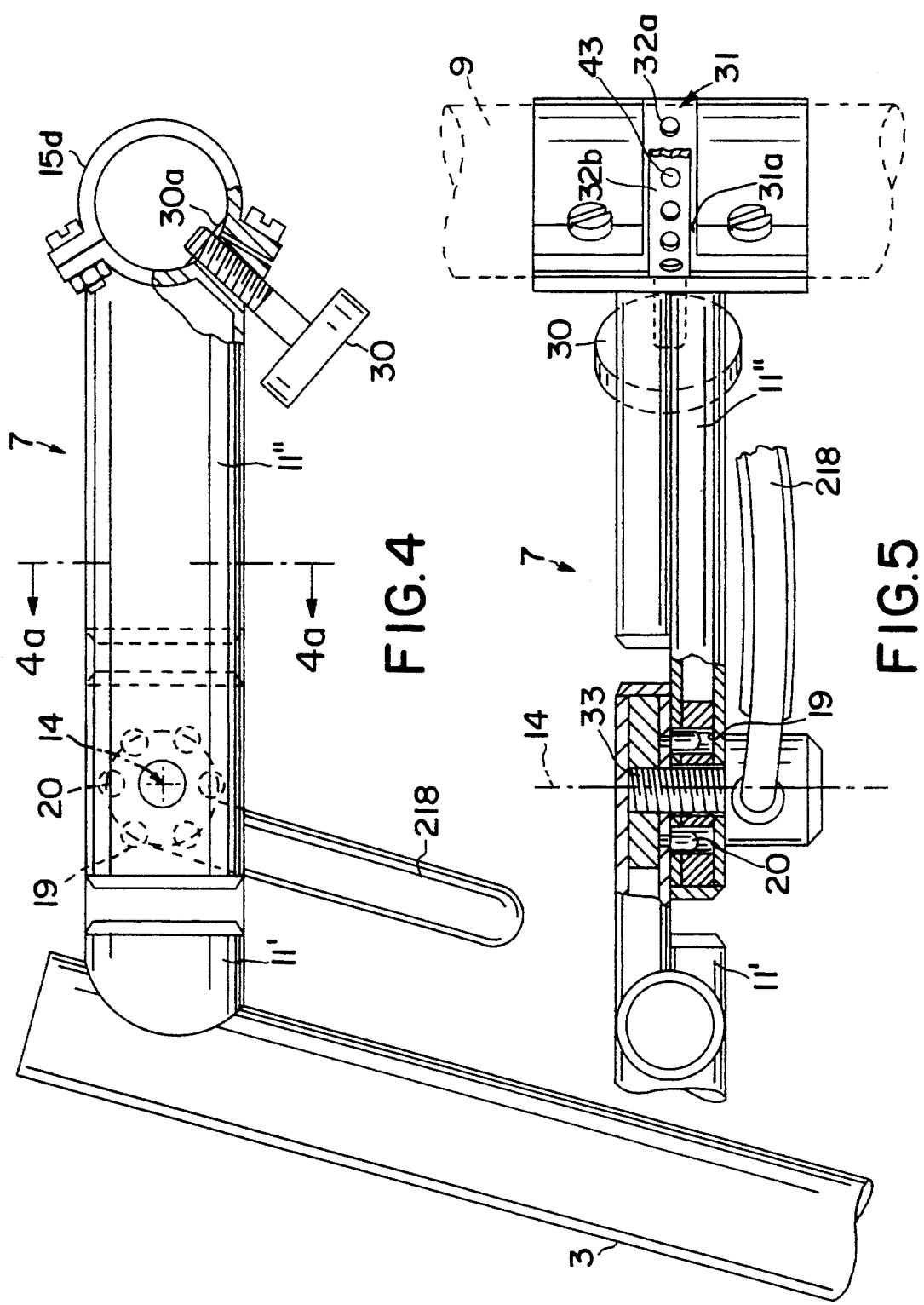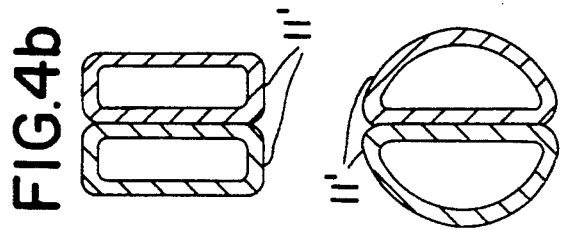

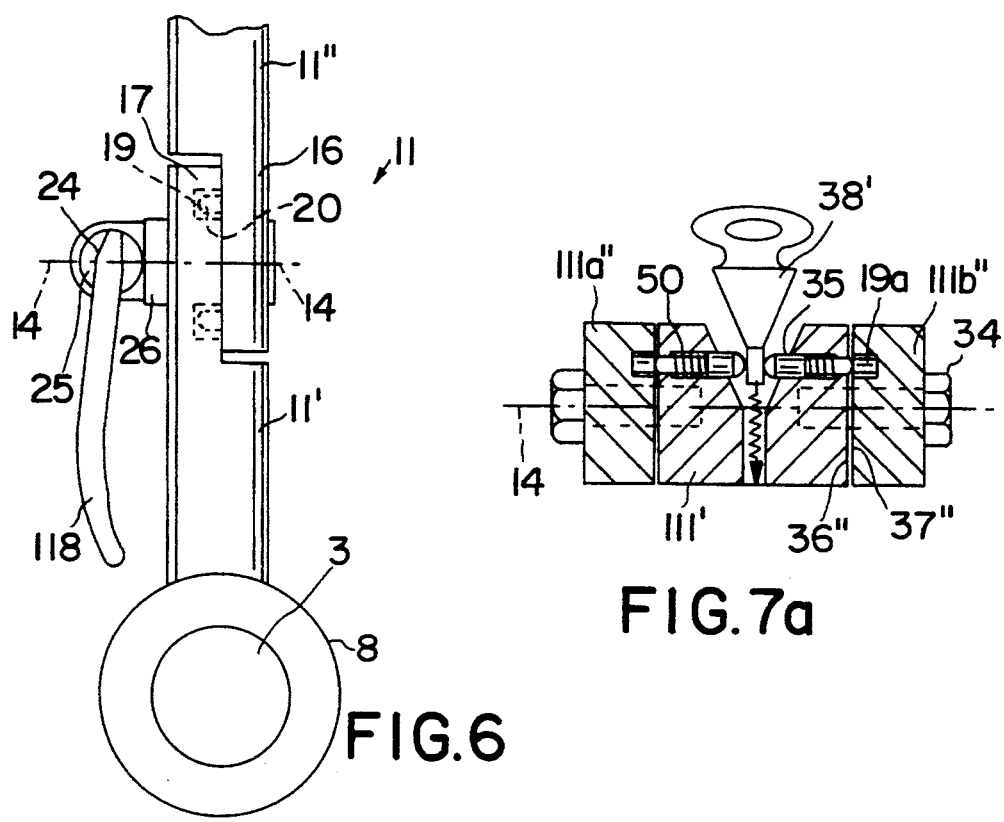
FIG. 6
FIG. 7a
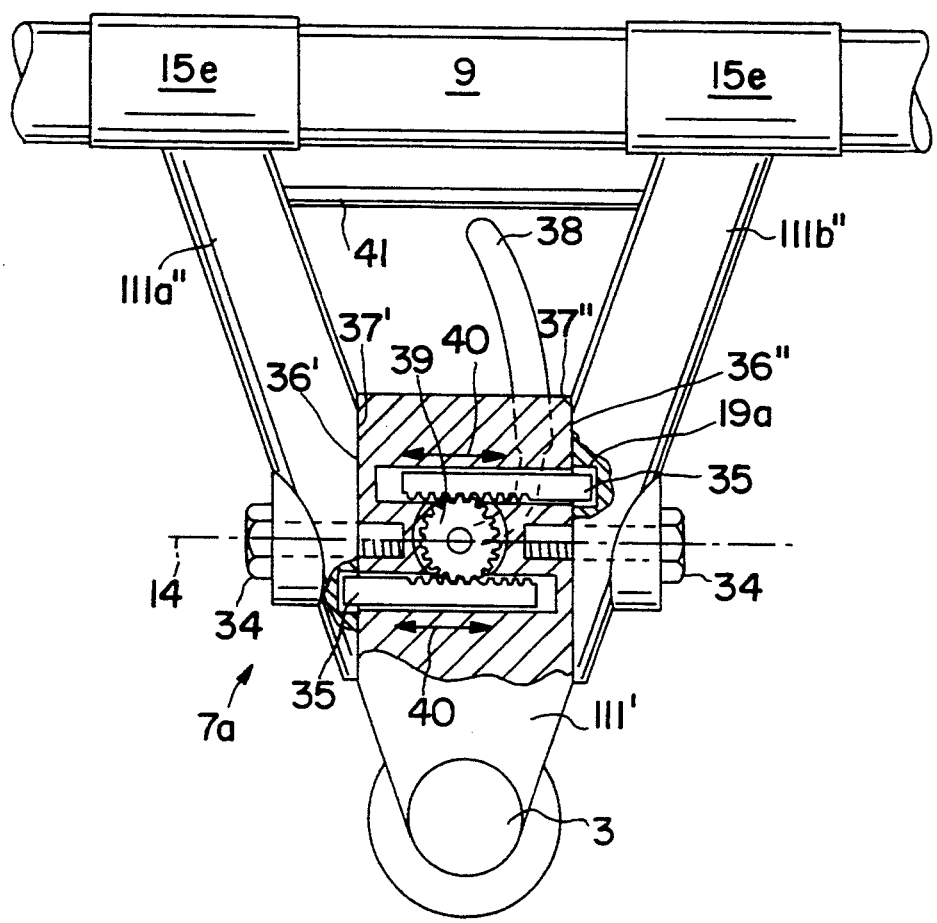
FIG. 7

STEERING ROD CONNECTABLE TO THE STEERING COLUMN OF A VEHICLE

The invention relates to a steering rod device in which a vehicle steering rod is connected by a centrally located connecting arrangement to a steering column.

BACKGROUND OF THE INVENTION AND RELEVANT ART

Such steering rods are adjustable in height, in their position relative to the steerer, in general via a two-part telescopic steering column which is then fixed at the desired height. The steering rod itself is hinged to the steering column by means of an articulated arm and is fixed to said column by means of a tube clamp. If the tube clamp is opened, or slackened, the steering rod itself can be rotated and hence the gripping position relative to the steerer can be changed. The two adjustment facilities, both the height adjustment and the rotation, are generally only used once, i.e. for adaptation to the person steering, since fixing must be very reliable and must on no account be loosened during the journey.

Particularly when riding for sport, as, for example, when riding mountain bikes, however, this fixing of the steering rod is found to be extremely disadvantageous. Thus, the steering rod is generally felt to be too low or too far away from the body when ascending but too high or too close to the body when descending. After long riding times, it is desired to adjust—generally raise—the steering rod in order to be able to assume a relaxed posture.

Various proposals have been made for adjusting steering rods in terms of height and/or position relative to the rider.

Thus, U.S. Pat. No. 2,594,451 describes an adjusting facility in which a spring-loaded pin locks in depressions in a disk coordinated with the steering column. However, this connection will prove insufficient when the wheel is subjected to a relatively strong load, even when the articulated arm bearing the articulated rod is additionally clamped to the disk. Even additional securing by means of a crosspin prevents only unintentional removal of the pin from the depression. The adjustment itself requires three fastening steps; fixing the position by means of one—essentially weak—pin alone appears insecure and susceptible to breakage.

In the adjusting apparatus described in French Patent 404,027, an articulated part connected to the steering column is gripped by the jaws of a support arm holding the steering column, both the articulated part and the jaws having flutings converging in a ray-like manner. When the support arm is rotated, the diametrally opposed locking surfaces on the jaws of the support arm and on the articulated part can lock with one another because the jaws as such are resilient. The desired rotation position is then secured by means of a screw bolt. Owing to frequently made adjustments and/or extensive use of the bicycle, fastening means will have a certain play and, after a certain time, this connection will become insecure, precisely because of the resilience of the jaws. There is the danger that—particularly during cross-country journeys, impacts will slacken the connection and the support arm with the steering rod will bend in an uncontrollable manner.

SUMMARY OF THE INVENTION

It is the object of the invention to make a steering rod readily adjustable in its particular position, both a height adjustment and a rotation and hence a change in the distance from the body of the steerer being possible. An essential feature is the safe adjustment which, if necessary, should also be possible while riding and which ensures that the connection of the articulated arm parts cannot be slackened either in extreme situations or through an accidental manipulation. This object is achieved by a steering rod device with a steering rod and a centrally located connecting arrangement for connecting the steering rod to a steering column. The centrally located connecting arrangement has an articulated arm swivellable about at least one hinge pin, fixing means for fixing the articulated arm in different locking positions, opposed locking surfaces on the articulated arm having projections and depressions engaging the projections for defining the locking positions. The fixing means has a clamping distance smaller than the length of the projections. The steering rod device also includes a release means for completely releasing the projections from the depressions.

Such a steering rod device can be used in principle for various vehicles, both for muscle-powered and for motorized ones. Examples of these are motor-assisted bicycles, three-wheeled vehicles, motorcycles and the like, as well as bob sleighs or the like, and gliding vehicles having or requiring steering rods. The invention is preferably used for bicycles. Because the fixing means has a clamping distance which is smaller than the length of the projections, unintentional disconnection, which is extremely dangerous during riding, is not possible even when the vehicle is used by children. For complete disconnection, additional means must be operated. This presents no problems particularly when the projections are in the form of pins, i.e. are formed with defined sidewalls stepped toward the direction of rotation, and when the locking surfaces are formed inelastically on rigid articulated arm parts and thus cannot yield, even after a relatively long time.

The projections of a first locking surface are arranged removably with respect to that surface, and means—if necessary acting against the restoring force of a retaining spring—are provided for moving these projections into the depressions of a second locking surface. If projections are provided which are movable relative to both locking surfaces, it is possible, particularly if these projections are spring-loaded, to carry out the adjustment of the steering rod without problems, even during riding. Particularly advantageous for this purpose is an embodiment in which this movement can be effected via the fixing means, in particular in the form of toothed gears or eccentric gears.

The stability of the steering rod fastening, especially with respect to lateral rotations, is considerably improved if the bendable section is formed in two parts.

If, after loosening of the clamps, the resistance of a lock or blocking means has to be overcome in order fully to release the projections, the safety with respect to improper handling is further increased.

To ensure that the steering rod is correctly oriented with respect to the steerer in any selectable setting, or can be adjusted to suit its preferred posture during riding, it is possible to provide a connecting arrangement that can be connected to the rotatable steering rod via at least one, preferably two-part, tube clamp by means of a securing screw. The tube clamp has two stops for limiting the rotation of the steering rod, and the latter has at least one—preferably screw head-shaped—counterpart for cooperating with said stops. The securing screw can be inserted—in particular under a load from a tension spring—into holes a distance apart in the steering rod—preferably in a ring arranged within the recess of the tube clamp.

DESCRIPTION OF THE DRAWINGS

Further details of the invention are evident from the following description of preferred embodiments shown schematically in the drawings, in which:

FIG. 1 shows a perspective view of a bicycle according to the invention;

FIG. 2 shows a side view of a steering rod on a steering column, partly in section;

FIG. 3 shows an exploded view of a first embodiment of the fixing means in an axonometric view;

FIG. 4 and 5 show a side view and a plan view, respectively, partly in section, corresponding to FIG. 2;

FIGS. 4a and 4b show two variants of a section along the line 4A—4A of FIG. 4;

FIG. 6 shows a plan view of the steering column and a connecting arrangement according to a second embodiment;

FIG. 7 shows a third embodiment having a reinforced connecting arrangement between steering column and steering rod, and FIG. 7a shows a section through a fourth embodiment according to FIG. 7.

DETAILED DESCRIPTION OF PREFERRED EMBODIMENTS

According to FIG. 1, a bicycle 1 has a bicycle frame 2. The steering column 3 is in two parts and adjustable in height in a telescopic manner, fastening being effected, for example, by means of a tube clamp 4.

A connecting arrangement 7 is provided at the upper end of the steering column 3. This connecting arrangement 7 consists in this case of two articulated arm parts 11' and 11"; however, as shown further below, it may consist of one part or a plurality of parts. In the case shown in FIG. 1 and 2, the connecting arrangement 7 is fixed to the steering column 3 by means of a connecting sleeve 8. It is just as possible for the connecting arrangement to be welded or soldered to the steering column. The straight or curved steering rod 9 is held firmly on the connecting arrangement 7 by a tube clamp 15.

In order for the steering rod 9 to be readily adjustable in its position relative to the steerer, both with respect to its height and with respect to the distance from the steerer's body, it is sufficient to slacken a fixing screw means 12 on the articulated arm 11 and hence to release the connecting arrangement 7, as explained below.

FIG. 2 shows an embodiment in which the articulated arm 11 consists of two parts 11', 11" connected to one another by means of a hinge pin 14. (Hereinafter reference to hinge pin 14 is also intended to refer to the longitudinal axis of the hinge pin 14, about which the two arm parts are swivellable).The part 11" carries the steering rod 9 with its grips 10 (only one is shown), whereas the part 11' is firmly connected to the connecting sleeve 8 and, by means of this, to the steering column 3.

The section 11' of the articulated arm, which section is connected rigidly to the steering column 3, extends essentially horizontally and is directed slightly upward.

It should be mentioned that only one articulated arm having a single hinge pin 14 is described with reference to the drawing and that this embodiment will meet the needs in general and is therefore also preferred, owing to the simplicity of the design. However, it may also be desirable to use an articulated arm composed of three or more articulated parts having two or more hinge pins.

In FIG. 2, various possible positions of the articulated arm section 11", are shown as a dashed line, a dash-dot line and a dash-dot-dot line, and section 11" can be brought into positions 11a, 11b and 11c, in which latter position the grip rod 9 assumes the position 10c shown. Also shown is the particular position of the connecting clamp 15 holding the steering rod, said clamp being shown in its positions 15a, 15b and 15c. It is evident from this that the steering rod can be adjusted to different heights in a simple manner as desired. As can readily be seen, it is also possible to have grip positions bent at different angles for curved steering rods. However, since the brakes must be used just as reliably in each of these positions, the steering rod adjustment shown in FIG. 4 and 5 is preferred, so that the positions of the grips and hence also those of the brakes are then always the same, in spite of adjustment of the steering rod. In order to be able to fix the steering rod securely in any position, the articulated arm 11 preferably has wide locking surfaces 16, 17, which are described with reference to a preferred embodiment shown in FIG. 3.

As shown in FIG. 3, the two sections 11' and 11" (position 11a) of the articulated arm 11 are connected to one another via the locking surfaces 16, 17 facing one another. The hinge pin 14 whose joint is in the form of a screw on which a nut (not shown) connected to a relatively long actuating lever 18, is screwed at that end of the screw which is not visible here, in order to press the two surfaces 16, 17 against one another. This connecting screw may also be in the form of an eccentric lever screw. The locking surface 17 has a number of depressions 19 which are distributed over an imaginary circle with the hinge pin 14 as midpoint and which are expediently circular in order to receive the pins 20 on the locking surface 16. In principle, the depressions and pins could have a very wide range of shapes; the diameters of the pins and of the depressions should, however, correspond to one another so that the joint sections 11', 11" are held nonrotatably after the pins 20 have penetrated the depressions 19.

Thus, the connection can be released by slackening the screw connection by turning the lever 18 to such an extent that the pins 20 can come out of the locking depressions 19, whereupon the two joint sections 11' and 11" can be brought into a new position. The connection is preferably retained over the sufficiently long screw pin 14, which in general has been completely removed only for repair or maintenance work.

The number of pins or depressions may be chosen freely, but of course two such locks 19, 20 constitute the minimum. The releasing of the connection between the two locking surfaces 16, 17 by means of the actuating lever 18 is effected, according to the invention, in two steps. A securing clamping distance, which is determined either by a rotation which is possible as far as a blocking resistance, by the turning of an eccentric screw, by the turning or removal of a lock nut or by the swivelling of a clamping lever, is provided to enable this connection to be slackened but not yet released. The pins 20 are accordingly dimensioned so that they still engage the depressions 19 even after its clamping has been slackened. The pins 20 can be released from the depressions 19 and hence the two articulated arms 11 can be rotated relative to one another only after further actuation of the fixing means 18, which actuation is effected, for example, by overcoming a locking mechanism coordinated with the screw turns.

The locking resistance which has to be overcome after eliminating the clamping effect in order completely to release the connection can be provided in a very wide range of ways. Thus, it may be in the form of catches or ratchets, but it is also possible to use a purely mechanical catch, as described further below with reference to FIG. 7.

FIG. 4 and 5 show a preferred embodiment, the steering rod 9 (indicated in FIG. 5) being connected to the connecting arrangement 7 by a tube clamp 15d which can be fixed or released by means of at least one securing screw 30. As already described above, this makes it possible simultaneously to turn the steering rod 9 when the two joint sections 11' and 11" are rotated about the hinge pin 14. To ensure that the steering rod always remains centered, the tube clamp 15d is in two parts or has a central slot or recess 31 in which a projection 32 provided on the steering rod 9 is guided. The ends of this central slot 31 can thus serve as stops 3a for the extreme end positions of the steering rod 9, which are predetermined by the maximum possible adjustment about the hinge pin 14.

FIG. 5 shows two variants for the embodiment of such a projection 32. The projection 32a may be, for example, in the form of a screw head, so that the steering rod 9 can be easily pushed into the tube clamp 15d during repairs. Another possible embodiment of the projection 32 comprises providing a ring 32b which is provided with holes 43 and is fastened to the steering rod 9. This ring 32b (shown only in part in FIG. 5) may also be only in the form of an annular segment if the central slot 31 is not made continuous. The securing screw 30 can be tightened, for example, against the tensile force of a tension spring 30a from one of the holes 43 and can be snapped in again under spring load in the desired position of the steerer. However, the securing screw 30 may also be fixed by means of a screw thread provided in the holes 43.

FIG. 4a, which represents two variants of the section along the line 4A—4A of FIG. 4 a first variant with flat tubes, and a second variant with curved tubes, shows an advantageous embodiment of the connecting arrangement 7 in the form of two profiled tubes symmetrical to one another. The locking surfaces 16 and 17 are thus predetermined, which is clearly evident in particular from FIG. 5, which shows a section through the connecting arrangement 7. Both pins 20 and depressions 19 can be provided in a simple manner here. An eccentric lever screw 218 ensures a rapidly releasable and securely fixing connection of the joint sections. Complete release of the pins 20 from the depressions 19 is effected in the manner described with reference to FIG. 3. The two arm parts 11' and 11" are connected together by pin 33 in nut 33a. To permit convenient adjustment of the joint sections, in this case too the pins 33 of the clamp or screw connection 218 or 18, respectively, should be longer than the pins 20, said pins 33 determining the hinge pin 14.

FIG. 6 shows a slightly modified embodiment in plan view. The hinge pin 14 has, at one end, a flattened part 24 in which the axle of a cam 25 rotatable by means of an actuating lever 118 is mounted. The cam 25 presses against a collar 26 connected to locking surface 17, in order thus to press the two locking surfaces 16, 17 against one another. The two locking surfaces 16, 17 can then be completely released, for example, by simply turning a screw.

The connecting arrangement may furthermore consist of only one part, in which case a single articulated arm is hinged with its locking surface directly to the steering column, which may also be curved, and to a locking surface provided thereon. This may De effected, for example, in a manner corresponding to FIG. 3. This single-arm embodiment has the advantage of the possibility of very different height adjustments.

For particularly extreme use, as is the case, for example, in trials, the steering rod 9 is doubly held, as shown in FIG. 7. The connecting arrangement 7a is, for example, V-shaped for this purpose, and the steering rod 9 is then fixed by means of two tube clamps 15e. In order to be able to adjust the steering rod 9 here in the manner described above, two joint sections 111"a and 111"b engage one joint section 111', which is firmly connected to the steering column 3. The joint section 111' accordingly has two locking surfaces 37' and 37", which cooperate with the locking surfaces 36' and 36" of the two joint sections 111"a and 111"b. The hinge pin 14 is fixed by the screws 34 connecting the joint sections 111' and 111". Here, these screws 34 need be neither slackened nor removed if it is desired to adjust the steering rod 9.

The releasable connection of the joint sections 111' and 111" is provided by means of displaceable pins 35. A pivot lever 38 whose clamping effect must first be released in the manner described above rotates a cylindrical wheel 39 which is provided with teeth and which engages the pins 35 likewise provided with teeth on one side and hence permits diametrally opposed displacement of the pins 35 as indicated by the arrows 40 in depressions 19a. In this arrangement, the securing pins 35 for one joint section 111" are each provided only on one side and located one on top of the other. Two pins 35 and corresponding depressions 19a per pair 36',37' and 36", 37" of locking surfaces would generally be sufficient. For better clamping in the depressions 19a, the pins 35 may be slightly conically shaped.

If, for example, the actuating lever of the fixing means 38 is curved in a downward direction, the articulated arm part 111" a prevents further rotation of the lever and hence complete release of the pins 35 from the depressions 19a. For this purpose, the lever must then be rotated upward or swivelled away, a measure corresponding to the catches described above thus having been taken.

Instead of the described pin fixing and adjustment via the toothed wheel, the pins may also be pressed by means of an eccentric nut into the depressions provided. If this nut is turned by means of the pivot lever, the pins are forced back, by reset springs, into their guides in the fixed joint section hinged to the steering column. Depending on position, size and shape of the nut, the pins in this case may be differently distributed in the locking surfaces.

FIG. 7a shows a section through another embodiment according to FIG. 7. A conical fixing means 38' subjected to a load by a tension spring 50 is pressed into a corresponding recess in the articulated arm 111', the pins 35 which are movable relative to both locking surfaces 36 and 37 of each articulated arm part 111" and are likewise under a load from a tension spring being pressed into the depressions 19a of the articulated arm parts 111". For secure clamping of the connection, the fixing means 38' is provided in the form of, for example, a bayonet connection which can be plugged together and then displaced or rotated. The pins 35 and/or fixing means 38' may similarly also be under a load from a compression spring.

As described above, the steering rod 9 itself can be subsequently rotated in the tube clamps 15e. A thin, securing connection 41 between the two sections 111" is provided to prevent mutual tilting of the two joint sections 111"a and 111"b, just as in the case of the adjustment of the steering rod 9 via the joint sections 111' and 111".

An arrangement having pins which are movable relative to the two locking surfaces, corresponding to FIG. 7, is also possible for only a single pair of locking surfaces.

A large number of variants are possible for the purposes of the invention; thus, the joint section 11' could be connected to a worm wheel which engages a self-locking worm connected to the section 11" and mounted thereon, in order to realize continuous adjustability. The worm may then be capable of being operated by means of a hand crank which is preferably driven by a servo motor which is supplied by the dynamo of the bicycle or a battery mounted on a frame 2. In this way, it is possible to adjust the steering rod through a journey by simply operating a motor switch, without being distracted from the traffic as a result. In principle, the worm (or another gear) may not be self-locking because it would also be possible to ensure that an automatic brake is effective at the end of each actuation, but the structural parts belonging to the brake are omitted if a self-locking gear is chosen.

I claim:

1. A steering rod device for bicycles comprising
a steering rod, and
a centrally located connecting arrangement for connecting said steering rod to a steering column,
said centrally located connecting arrangement comprising an articulated arm,
said articulated arm comprising at least two arm parts, said two arm pads comprising a first arm part fixedly linked to said steering column and a second arm part having at least one tube clamp with a securing screw for connection to said steering rod,
said two arm parts being swivellable about an axis normal to the longitudinal axis of said steering column and normal to the longitudinal axis of said two arm pads by means of a hinge joining said two arm parts,
said hinge comprising opposed locking surfaces on said two arm parts, said opposed locking surfaces comprising a first locking surface having projections for engaging depressions arranged on a second locking surface opposed to said first locking surface.

said centrally located connecting arrangement further comprising fixing means for fixing said two arm parts in different locking positions that are defined by engagement of said projections and said depressions,
said fixing means having a clamping distance smaller in length than said projections, for loosening the connection of said two arm parts, but not releasing said projections from said depressions,
said centrally located connecting arrangement further comprising release means for completely releasing said projections from said depressions, and
said fixing means and said release means being operable when riding the bicycle without releasing said steering rod.

2. A steering rod device according to claim 1, wherein said projections comprise at least two pin-shaped projections, and said locking surfaces are arranged inelasticly on said articulated arm.

3. A steering rod device according to claim 1 or 2, further comprising moving means for moving said projections with respect to said first locking surface and for moving said projections into said depressions on said second locking surface.

4. A steering rod device according to claim 3, further comprising a retaining spring for providing a restoring force against moving said projections into said depressions on said second locking surface.

5. A steering rod device according to claim 1, wherein said fixing means is arranged for moving said projections relative to said second locking surface.

6. A steering rod device according to claim 5, wherein said fixing means is selected from the group comprising a toothed gear and an eccentric lever.

7. A steering rod device according to claims 1 or 2, wherein said articulated arm comprises two second arm parts swivellable about said hinge.

8. A steering rod according to claim 7, wherein said two second arm parts and said steering rod have longitudinal axes that lie in a common plane.

9. A steering rod device according to claims 1 or 2, wherein said release means comprises lock means for providing resistance against complete release of said projections from said depressions.

10. A steering rod device according to claim 9, wherein said lock means is arranged on said fixing means.

11. A steering rod device according to claim 1, wherein said steering rod is rotatable in said tube clamp, further comprising two stops on said tube clamp for limiting rotation of said steering rod, at least one screw-head-shaped counterpart device on said steering rod for cooperating with said stops, a recess in said tube clamp, and a ring arranged in said recess and having spaced holes therein for insertion of said securing screw.

12. A steering rod device according to claim 11 further comprising spring means for providing a spring tension load on said securing screw.

* * * * *